US006615055B1

(12) United States Patent
Aoto

(10) Patent No.: US 6,615,055 B1
(45) Date of Patent: Sep. 2, 2003

(54) STRUCTURE OF ROD ANTENNA GUIDE PORT IN CELLULAR TELEPHONE

(75) Inventor: Kouzou Aoto, Kanagawa-ken (JP)

(73) Assignee: Nissin Parts Co., Ltd., Tokyo (JP)

( * ) Notice: Subject to any disclaimer, the term of this patent is extended or adjusted under 35 U.S.C. 154(b) by 485 days.

(21) Appl. No.: 09/657,981

(22) Filed: Sep. 8, 2000

(30) Foreign Application Priority Data

Dec. 22, 1999 (JP) .......................................... 11-364080

(51) Int. Cl.[7] ............................ H04B 1/38; H04M 1/00

(52) U.S. Cl. ......................... 455/550; 455/90; 343/702; 343/900

(58) Field of Search .......................... 455/550, 90, 128, 455/129, 575; 343/702, 888, 889, 900

(56) References Cited

U.S. PATENT DOCUMENTS 5,535,439 A * 7/1996 Katz .......................... 455/117
6,104,350 A 8/2000 Ng et al.

FOREIGN PATENT DOCUMENTS

JP 2604875 3/2000

* cited by examiner

*Primary Examiner*—Nguyen T. Vo
(74) *Attorney, Agent, or Firm*—Wenderoth, Lind & Ponack, L.L.P.

(57) ABSTRACT

There is disclosed a structure of a rod antenna guide port in a cellular telephone comprising a rod antenna guide port for allowing a rod antenna in a cellular telephone to be pulled out therethrough with an inclination, the guide port including an upper and a lower sleeve hole for allowing the rod antenna to be inserted therein, the lower sleeve hole serving as means for pressing, when the rod antenna is pulled out, one side surface of a lower end portion of the rod antenna so that the rod antenna is offset to one side, thereby enabling to pulling out the rod antenna with an inclination through the upper sleeve hole, wherein the upper sleeve hole includes a slit sleeve composed of a plurality of slit elements annularly arranged, a split spring sleeve being externally fitted to the slit sleeve so that the slit sleeve can be expanded and contracted in a radial direction, the slit elements of the slit sleeve being pressed by the rod antenna pulled out with an inclination so that the slit elements are expanded (or dilated) against a resilient force of the slit spring sleeve, a lower portion of the rod antenna being pressed against an inner wall of each of the slit elements by a restoring force of the,expanded (dilated) slit elements, so that the rod antenna is assuredly pulled out with an inclination.

5 Claims, 6 Drawing Sheets

STRUCTURE OF ROD ANTENNA GUIDE PORT IN CELLULAR TELEPHONE

BACKGROUND OF THE INVENTION

1. Field of the Invention

This invention relates to a structure of a rod antenna guide port for allowing a rod antenna of a cellular telephone to be pulled out therethrough with an inclination in a direction away from the side of its user's head.

2. Related Art

In Japanese Utility Model Non-Examined Publication No. H07-25606, when a rod antenna received in an exterior housing of a cellular telephone is pulled out through a rod antenna guide port formed in the exterior housing, an enlarged diameter portion of a lower end of the antenna is offset to one side through an eccentric hole such that the rod antenna is inclined.

Moreover, as shown in FIG. 9A, a lower end portion of an attachment threaded sleeve, which defines the rod antenna guide port 2, is split to form a split spring sleeve 23 having a plurality of split spring elements 24 and the rod antenna 1 in the inclination position is held by the split spring sleeve 23.

Moreover, as shown in FIG. 9B, an eccentric hole (precision circular hole) S2 for offsetting the lower end portion of the antenna 1 to one side and a precision circular hole S1 for forming the split spring sleeve 24 are arranged with a shift in location, i.e., the two precision circular holes S1, S2 are eccentrically arranged, so that the offset amount is set by this eccentric amount W1.

However, since the related art is constructed such that the split spring sleeve 21 having a plurality of split spring elements 22 is formed by splitting the lower end portion of the attachment threaded sleeve which defines most part of the rod antenna guide port 2, the entire attachment threaded sleeve including the split spring sleeve 21 must be made of beryllium copper which is suited as a spring material but which is very expensive. This gives rise to a problem in that the cost is increased.

Moreover, the entire attachment threaded sleeve made of beryllium copper must be cut and in addition, the beryllium copper having a high degree of hardness and difficult to be cut must be cut. This can further increase the cost.

Furthermore, it is difficult to make adjustments for pulling out the rod antenna easily and for properly setting the spring property for resiliently retaining the rod antenna in the inclination position when it is pulled out.

Moreover, the structure in which the amount of offset is set based on the amounts of eccentricity W1 of the two perfect circular holes S1, S2 has such problems that if the amount of eccentricity W1 of the perfect circular hole S2 with respect to the perfect circular hole S1, it becomes difficult to receive the rod antenna in its vertical posture and therefore, a sufficient amount of eccentricity W1 is difficult to obtain, thus making it difficult to obtain a sufficient inclination angle of the rod antenna.

The present invention has been accomplished in view of the above situation.

SUMMARY OF THE INVENTION

It is, therefore, an object of the present invention to provide, in order to amicably solve the various problems involved in the related art, a structure of a rod antenna guide port in which a rod antenna received in a cellular telephone can be pulled out with an inclination.

To achieve the above object, there is essentially provided a structure of a rod antenna guide port in a cellular telephone comprising a rod antenna guide port for allowing a rod antenna in a cellular telephone to be pulled out therethrough with an inclination, the guide port including an upper and a lower sleeve hole for allowing the rod antenna to be inserted therein, the lower sleeve hole serving as means for pressing, when the rod antenna is pulled out, one side surface of a lower end portion of the rod antenna so that the rod antenna is offset to one side, thereby enabling to pull out the rod antenna with an inclination through the upper sleeve hole, wherein the upper sleeve hole includes a slit sleeve composed of a plurality of slit elements annularly arranged, a split spring sleeve being externally fitted to the slit sleeve so that the slit sleeve can be expanded and contracted in a radial direction, the slit elements of the slit sleeve being pressed by the rod antenna pulled out with an inclination so that the slit elements are expanded (or dilated) against a resilient force of the slit spring sleeve, a lower portion of the rod antenna being pressed against an inner wall of each of the slit elements by a restoring force of the expanded (dilated) slit elements, so that the rod antenna is assuredly pulled out with an inclination.

It is preferred that each of the slit elements composing the slip spring sleeve is provided on an intermediate portion of an inner peripheral surface thereof with a contact projection projecting inwardly, and the contact projection is provided on an upper portion thereof with an upper guide hole comprised of an inclination surface expanded(dilated) in a pulling out direction of the rod antenna and on a lower portion thereof with a lower guide hole comprised of an inclination surface expanded (or dilated) in a receiving direction of the rod antenna, such that when the rod antenna is pulled out with an inclination, the antenna lower portion is brought into abutment with the inclination surfaces of the upper and lower guide holes.

The split elements may be separated from each other.

It is also preferred that the lower sleeve hole is comprised of an enlarged diameter arcuate sleeve portion and a reduced diameter arcuate sleeve portion connected together, and when the rod antenna is pulled out, a connecting angular portion between the enlarged diameter arcuate sleeve hole portion and the reduced diameter arcuate sleeve hole portion press one side surface of a lower portion of the rod antenna so that the rod antenna lower portion is allowed to escape into the enlarged diameter arcuate sleeve hole portion and offset to one side, and when the rod antenna is received in the cellular telephone, an upper end portion of the rod antenna is received into the reduced diameter arcuate sleeve hole portion.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE EMBODIMENT

One embodiment of the present invention will now be described with reference to FIGS. 1 to 8.

The present invention relates to a structure of a rod antenna guide port for allowing a rod antenna 1 in a cellular telephone to be pulled out with an inclination.

Figure 1:
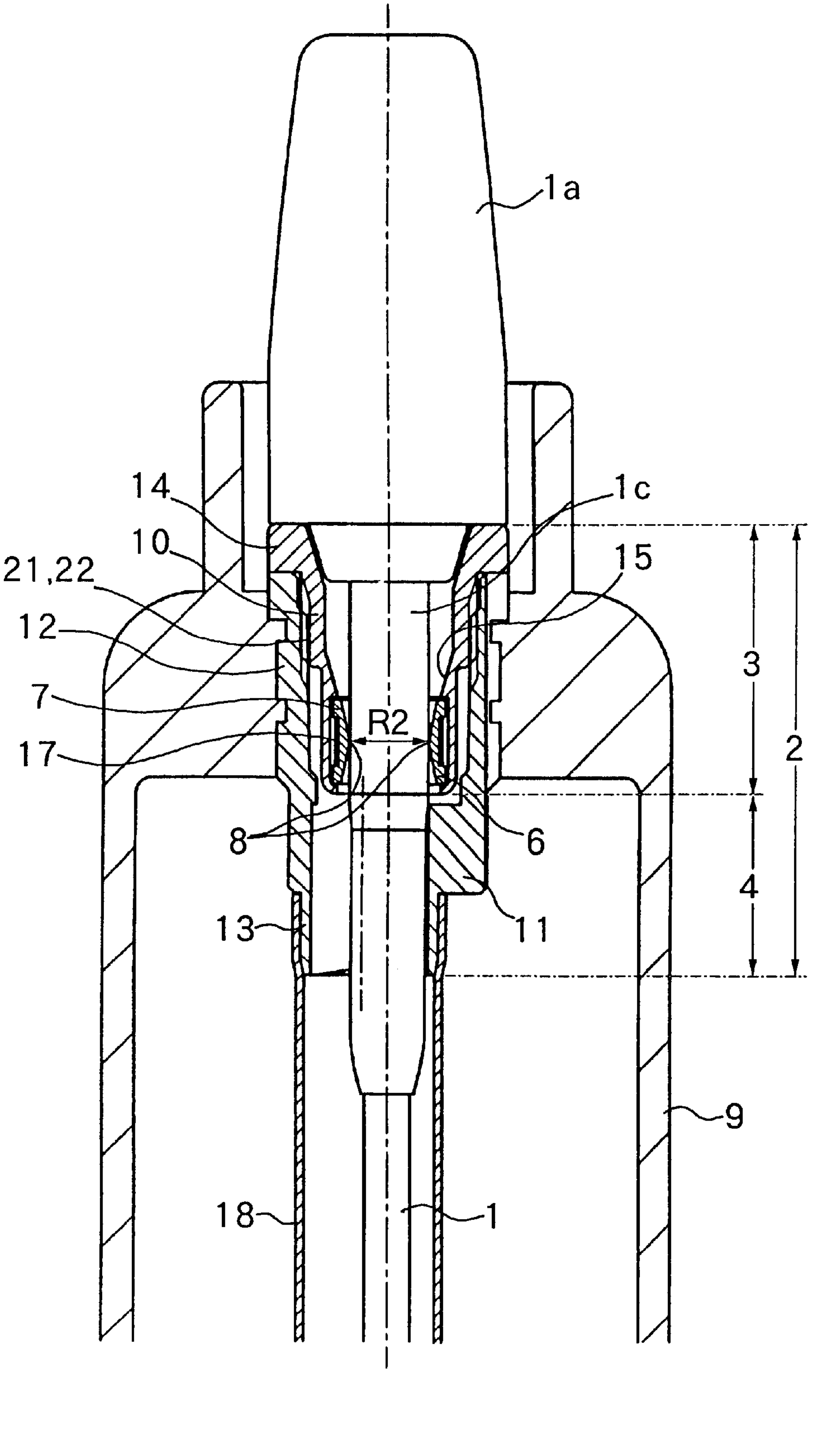
FIG. 1 is a sectional view of a structure of a rod antenna guide port according to one embodiment of the present invention, in which the rod antenna is in a vertical position.
Figure 2:
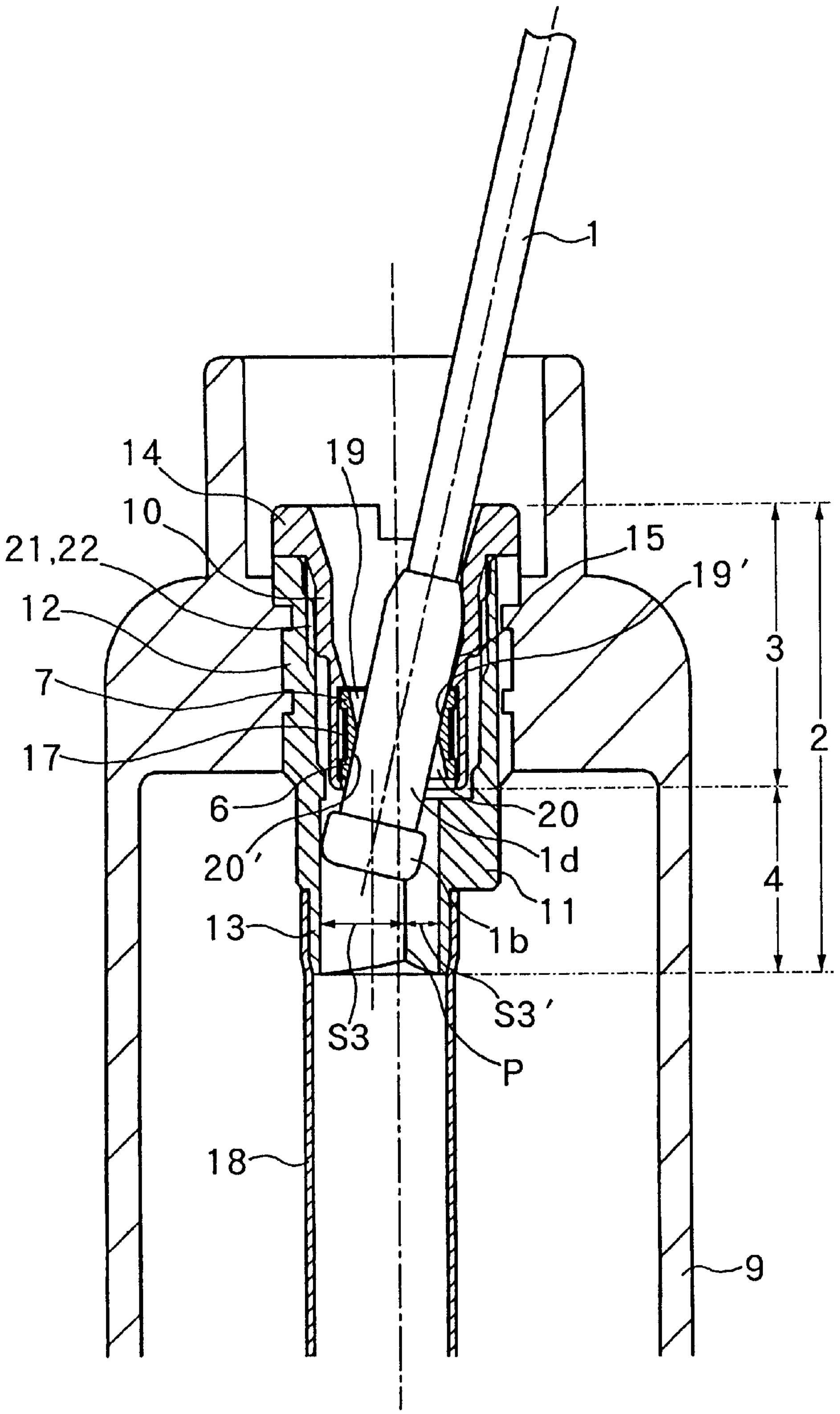
FIG. 2 is a sectional view of the above, showing a state in which the above rod antenna is pulled out with an inclination.

As shown in FIGS. 1 and 2, the rod antenna 1 received in the cellular telephone is provided at an upper end thereof with an enlarged diameter antenna head 1*a* in which a coil is received and at a lower end thereof with an enlarged diameter stopper 1*b* which is expanded annularly. Moreover, the rod antenna 1 is provided immediately under the antenna head 1*a* at the upper end thereof with an upper contact rod portion 1*c* made of electrically conductive metal and immediately above the stopper 1*b* at the lower end thereof with a lower contact rod portion 1*d* made of electrically conductive metal. The upper and lower rod portions 1*c*, 1*d* are composed of a metal sleeve which is externally inserted on and compression bonded to the upper and lower end portions of the rod antenna 1. The lower contact rod portion 1*d* and the stopper 1*b* form an enlarged diameter portion, as later described.

The antenna guide port 2 includes an upper sleeve hole 3 and a lower sleeve hole 4 which allow the rod antenna 21 to be inserted therein. The lower sleeve hole 4 forms a means for pressing and offsetting one side surface of the lower end portion of the rod antenna 1 to one side when the rod antenna 1 is pulled out. Due to the offsetting function of the lower sleeve hole 4, the rod antenna 1 is inclined when it is pulled out through the lower sleeve hole 4.

The rod antenna guide port 2 is defined by an inner sleeve 10 (corresponding to the attachment threaded sleeve 4 in the related art) and an outer sleeve 11 (corresponding to the attachment nut 2) which are both attached to a forming wall of an exterior housing 9 of the cellular telephone. Both the inner and outer sleeves 10, 11 are entirely integrally formed from electrically conductive metal. In the present invention, it is not necessary to form them from a panel such as beryllium copper or the like. In one embodiment of the present invention, they are formed from a casting such as an aluminum casting, a zinc casting or the like.

The outer sleeve 11 is provided at an upper half section thereof with an attachment sleeve portion 12 which is embedded in the forming wall of the exterior housing 9 of the cellular telephone and with a female thread 21 for threadingly engaging the inner sleeve 10 with an inner peripheral surface of the sleeve hole of the attachment sleeve portion 12. Moreover, the outer sleeve 11 is provided at a lower half section thereof with a rod antenna offsetting sleeve portion 13 connected to a lower end of the attachment sleeve portion 12 and projecting inward of the exterior housing 9 from the inner surface of the forming wall of the exterior housing 9. The lower sleeve hole 4 is defined by the offsetting sleeve portion 13.

An upper end of an antenna receiving tube 18 is externally inserted to a lower end of the rod antenna offsetting sleeve portion 13 such that the antenna receiving tube 18 vertically extends within the exterior housing 9.

As shown in FIGS. 2 and 8, the lower sleeve hole 4 includes an enlarged diameter arcuate sleeve hole portion S3 and a reduced diameter arcuate sleeve hole portion S3'. One pair of connected angular portions P of both the enlarged and reduced diameter arcuate hole portions S3, S3' define an offset means for pressing, when the rod antenna 1 is pulled out with an inclination, one side surface of the enlarged diameter portion (stopper 1*b*) of the lower end of the rod antenna 1 so as to be escaped into the enlarged diameter arcuate sleeve hole portion S3. Reference numeric symbol W2 denotes an amount of eccentricity of the enlarged diameter arcuate sleeve hole portion S3.

The enlarged diameter arcuate sleeve hole portion S3 is a circular arc about O1, which is larger than a semi-circular arc. In contrast, the reduced diameter arcuate sleeve hole portion S3' is a circular arc about O2, which is smaller than a semi-circular arc. The pair of angular portions P serving as the offset means is formed on a connecting point between the large circular arc and the small circular arc.

The inner sleeve 10, as shown in FIGS. 1 to 3(A) and 3(B), is provided at an sleeve portion outer peripheral surface of an upper half section thereof with a male thread 22 for threading engagement within the outer sleeve 11 and at the upper end with a flange 14 for setting the depth of threading engagement. The sleeve hole of the inner sleeve 10 defines the upper sleeve hole 3. The upper end side of the upper sleeve hole 3 is formed into a tapered hole 15 which is expanded (or dilated) outward. A slit sleeve 6 and a slit spring sleeve 17 having the under-mentioned construction are mounted at the lower end of the tapered hole 15, i.e., within the upper sleeve hole 3. That is, the split sleeve 6 and the split spring sleeve 17 are mounted within the sleeve portion of the lower half section of the inner sleeve 10.

Figure 3B:
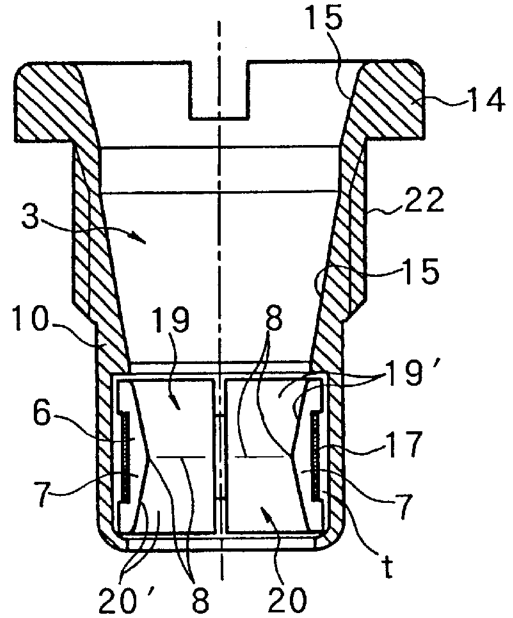
FIG. 3(B) is a sectional view taken on line A—A of FIG. 3(A)
Figure 3A:
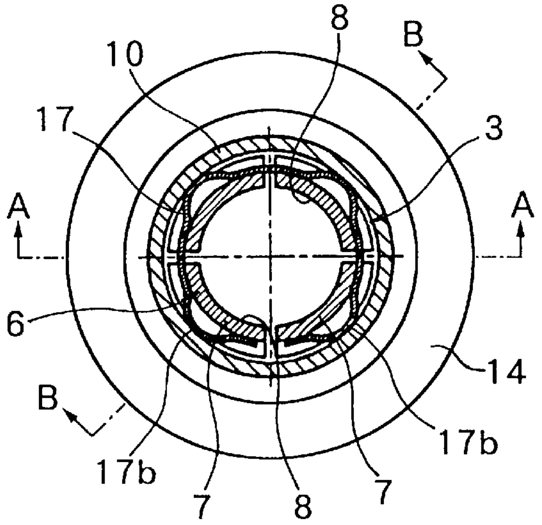
FIG. 3(A) is a sectional view, as viewed from a bottom, showing a state in which a split sleeve and a split spring sleeve are both disposed within an upper sleeve hole of an inner sleeve.
Figure 3C:
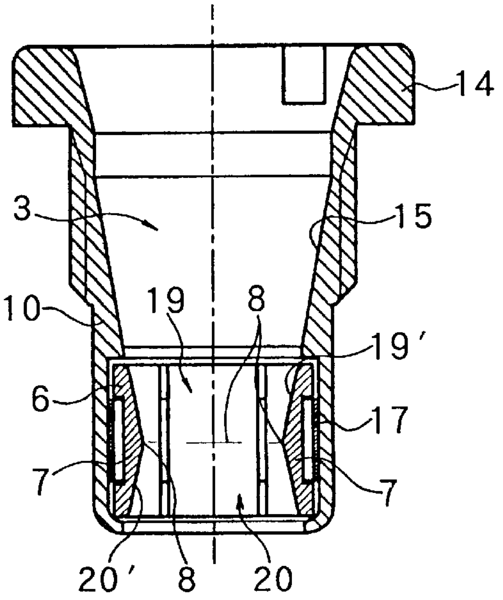
FIG. 3(C) is a sectional view taken on line B—B of FIG. 3(A) and FIG. 3(D) is a sectional view, as viewed from a bottom, of another example of FIG. 3(A), showing a state in which a split sleeve and a split spring sleeve are disposed within an upper sleeve hole of an inner sleeve.
Figure 3D:
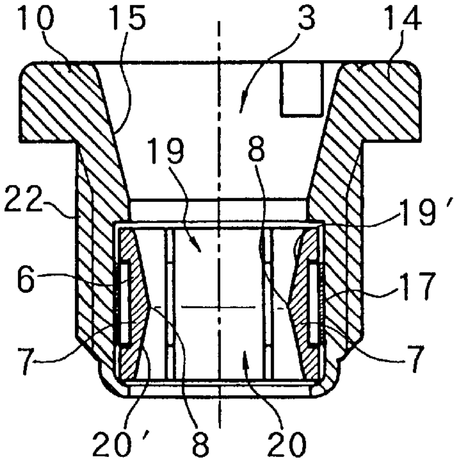

Moreover, as shown in FIG. 3(D), the split sleeve 6 and the split spring sleeve 17 are mounted within the sleeve hole portion immediately under the flange 14. In other words, the split sleeve 6 and the split spring sleeve 17 are mounted within the sleeve hole of the sleeve portion on which the male thread 22 is formed. By this, the lower half sleeve section of FIGS. 3(A), 3(B) and 3(C) is no more necessary. Therefore, the length of the inner sleeve 10 can be reduced extensively and thence, the length of the outer sleeve 11 can be reduced.

The split spring sleeve 17 is formed by forming a spring material, such as beryllium copper or the like, into a sleeve-like configuration and then forming a split 17*a* therein in an axial direction.

Figure 4A:
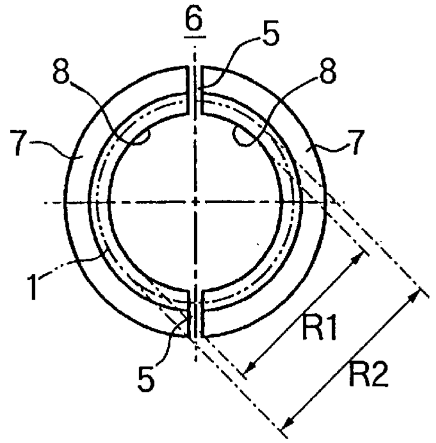
FIG. 4(A) is a plan view showing one example of a split sleeve.
Figure 4B:
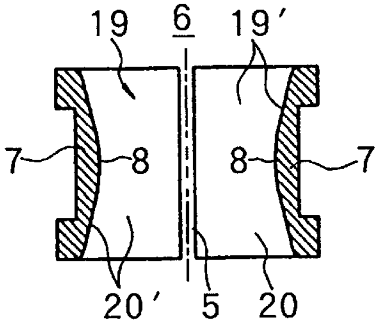
FIG. 4(B) is a sectional view, as viewed from one side, of the split sleeve.

On the other hand, as shown in FIG. 4, the split sleeve 6 has such a constitution that it is given to have resiliency by the split spring sleeve 17. Owing to this structure feature, it is not necessarily formed from a spring material and actually, it is formed from a casing such as an aluminum casting, a zinc casting or the like.

The split sleeve 6 is formed by arranging a plurality of arcuate split elements 7 in an annular form. The split spring sleeve 17 is externally fitted to the split sleeve 6 so that the split sleeve 6 can be expanded (or dilated) in a diametrical direction against the resiliency of the split spring sleeve 17 and contracted in accordance with the resiliency.

As one example, as shown in FIG. 4, the respective arcuate split elements 7 are separated from one another through the split groove 5, to thereby form the split sleeve 6.

Figure 5A:
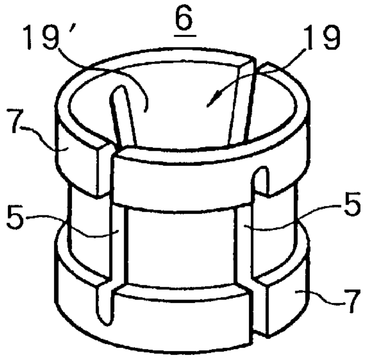
FIG. 5(A) is a plan view showing another example of a split sleeve.
Figure 5B:
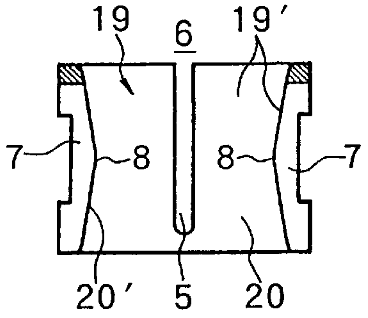
FIG. 5(B) is a sectional view, as viewed from one side, of the split sleeve.

As another example, as shown in FIG. 5, each of the arcuate split elements 7 are connected to another arcuate split element 7 which is adjacent thereto at one end of the split groove 5 such that the split sleeve 6 can be expanded (or dilated) and contracted in the diametrical direction about the connecting portion.

The split spring sleeve 17 is externally fitted to each of the exemplified split sleeves 6 so that the expanding/contracting resiliency of the arcuate split elements 7 is given to thereto.

Figure 7A:
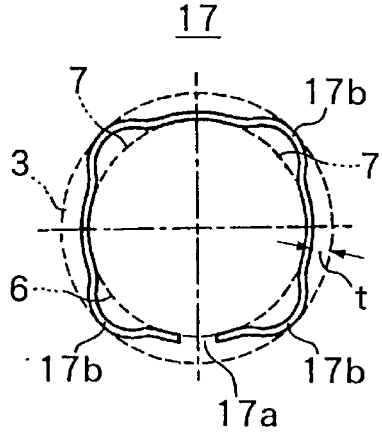
FIG. 7(A) is a plan view showing the split spring sleeve and FIG. 7(B) is a side view thereof.
Figure 7B:
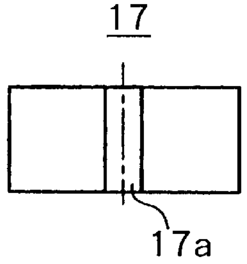

As shown in FIG. 7, the split sleeve 17 is formed by bending an electrically conductive metal strip formed from a spring material into a square sleeve shape with a single split groove 17*a* left open and forming an arc-like projecting curvilinear portion 17*a* at each corner portion of an outer peripheral surface thereof such that the split spring sleeve 17 can resiliently be displaced (expanded or contracted) following the expansion or contraction of the split sleeve 6.

The split spring sleeve 17 is internally fitted to a lower end sleeve hole of the inner sleeve 10 and the respective projecting curvilinear corner portions 17*b* are resiliently abutted with an inner wall surface of the lower end sleeve hole of the inner sleeve 10.

A space t for allowing expansion of the four sides of the split spring sleeve 17 and the split sleeve 6 is formed between adjacent two sides of the four sides of the spring sleeve 17. The projecting curvilinear corner portion 17*b* serves to offer a favorable electrical connection between each arcuate split element 7 and the inner sleeve 10.

As shown in FIGS. 3 to 6, each of the arcuate split elements 7 forming the split sleeve 6 is provided at an intermediate portion of an inner peripheral surface thereof with a contact projection projecting inward of the sleeve hole. Each arcuate split element 7 is further provided at an upper portion of the contact projection 8 with an upper guide hole 19 composed of an inclination surface 19 for dilating the rod antenna 1 in the pullout direction and at a lower end portion thereof with a lower guide hole 20 composed of an inclination surface 20' for dilating the rod antenna 1 in the receiving direction. Owing to a provision of the guide holes 19, 20, the rod antenna 1 pulled out from the inside of the exterior housing 9 of the cellular telephone 1 and offset to one side is inclined and held in the inclination position.

That is, the arcuate split elements 7 of the split sleeve 6 are pressed with the rod antenna 1 pulled out of the cellular telephone so that the arcuate split elements 7 are dilated against the resiliency of the split spring sleeve 17, and the lower portion of the rod antenna 1 is pressed against the inner walls of the arcuate split elements 7 (i.e., the inclination surfaces 19', 20' of the guide holes 19, 20 by the resilient restoring force of the elements 7 so that the rod antenna 1 is assuredly pulled out with an inclination.

Figure 6:
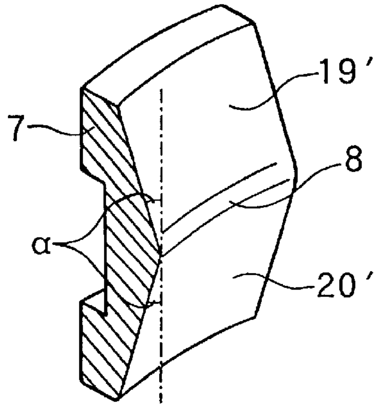
FIG. 6 is a perspective view, showing the arcuate split element of FIG. 5 in section.

As shown in FIG. 6, the inclination surfaces 19', 20' forming the upper guide hole 19 and the lower guide hole 20, respectively, are formed at an inclination angle $\alpha$ in harmony with an outer surface of the lower end enlarged diameter portion (lower contact rod portion 1*d*) of the rod antenna 1 which has been pulled out with an inclination and the attitude of inclination of the pulled-out rod antenna 1 is held at an inclination angle $\alpha$ stably.

As shown in FIG. 4, the contact projection 8 is disposed in an annular form extending in a circumferential direction along the inner surfaces of the arcuate split elements 7. The diameter R1 of an inscribed circle, which is defined by the contact projection 8, is set smaller than the diameters of the lower end enlarged diameter portion and the upper end portion (the lower contact rod portion 1*d* or the stopper 1*b* and the upper contact rod portion 1*c*) of the rod antenna 1, i.e., the diameter R2 of the enlarged diameter portion. By doing so, when the rod antenna 1 is vertically received in the cellular telephone, the contact projection 8 is resiliently press-contacted with the outer peripheral surface of the intermediate section having a reduced diameter of the rod antenna 1 through co-action between the split sleeve 6 and the split spring sleeve 17, so that the rod antenna 1 is received and held in the cellular telephone with no play.

The inner sleeve 10 is threadingly engaged with the inner wall of the sleeve hole of the outer sleeve 11, which is embedded for attachment in the forming wall of the exterior housing 9 of the cellular telephone, thereby the rod antenna guide port 2 is formed.

Figure 8A:
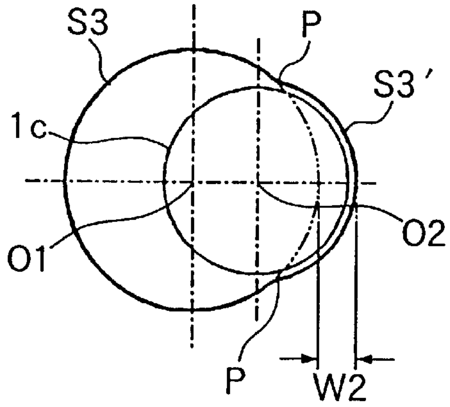
FIG. 8(A) is a plan view for explaining the principles of a lower sleeve hole for offsetting the rod antenna to one side by showing the rod antenna being pulled out with an inclination and FIG. 8(B) is likewise a plan view, but showing the rod antenna being received in the cellular telephone.
Figure 8B:
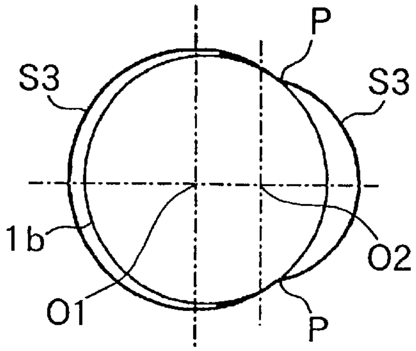
Figure 9A:
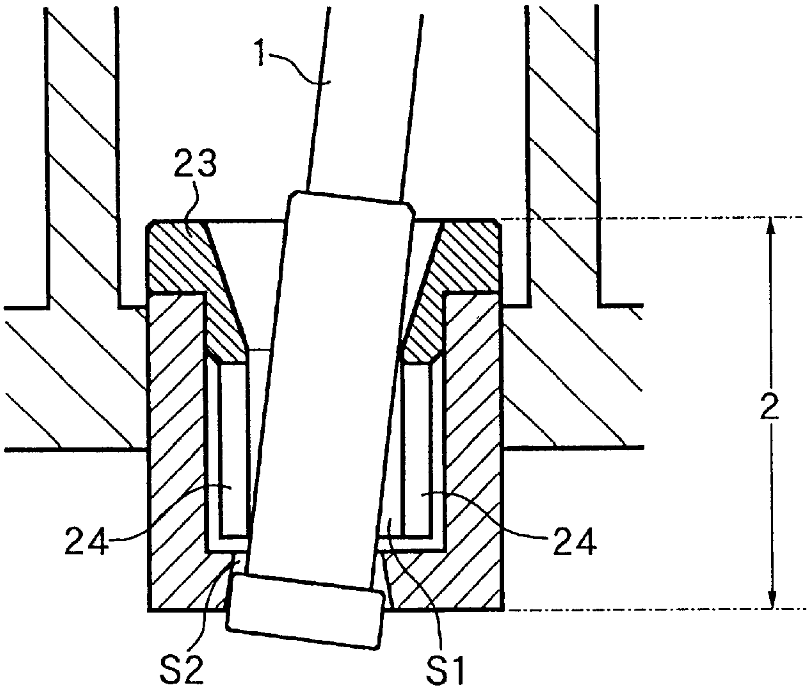
FIG.9A PRIOR ART
FIG. 9(A) is a sectional view for explaining a construction of a conventional rod antenna guide port by showing the rod antenna being pulled out with an inclination and FIG. 9(B) is a plan view for explaining the principles of an eccentric hole for offsetting the rod antenna to one side.
Figure 9B:
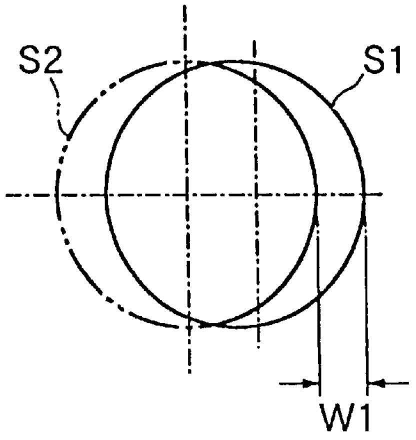
FIG.9B PRIOR ART

As shown in FIGS. 2 and 8(B), when the rod antenna 1 is pulled out through the rod antenna guide port 2, one pair of the connecting corner portions P between the enlarged diameter arcuate sleeve hole portion S3 and the reduced diameter arcuate sleeve hole portion S3' of the lower sleeve hole 4 press one side surface of the enlarged diameter portion (stopper 1*b*) of the lower end of the rod antenna 1 so that the lower end of the rod antenna is offset into the enlarged diameter arcuate sleeve hole portion S3.

At this time, while obtaining a sufficient angle for pulling out the rod antenna 1 with an inclination by the eccentric amount W2 of the enlarged diameter arcuate sleeve hole portion S3, most part of the enlarged diameter portion (stopper 1*b*) is received within the enlarged diameter arcuate sleeve hole portion S3' and only the remaining part is received in the reduced diameter arcuate sleeve hole portion S3' to thereby offset the lower end portion (lower contact rod portion 1*d*) of the rod antenna 1 to one side.

At the same time, the inclination surfaces 20' of the arcuate split elements 7 of the split sleeve 6 are abutted with the side surface of the lower end portion of the rod antenna 1 in the offsetting direction and the inclination surfaces 19' of the arcuate split elements 7 are abutted with the other side surface which is opposite to the inclining direction of the rod antenna 1. While dilating the arcuate split elements 7 against the resiliency of the split spring sleeve 17, the rod antenna 1 is inclined and held in the inclination position by reaction thereof.

That is to say, by the antenna inclining means composed of the split sleeve 6 mounted within the upper sleeve hole 3 and the lower sleeve hole 4 having the offsetting function, the rod antenna is correctly and smoothly pulled out with an inclination and assuredly held in the inclination position after the antenna 1 is pulled out.

As shown in FIGS. 1 and 8(A), when the rod antenna 1 is received in the exterior housing 9 of the cellular telephone through the rod antenna guide port 2, the upper end portion (upper contact rod portion 1*c*) of the rod antenna 1 is received in the reduced diameter arcuate sleeve hole portion S3' so that the rod antenna 1 is vertically received in the cellular telephone.

More specifically, the first half semi-circular portion of the rod antenna 1 is received in the reduced diameter arcuate sleeve hole portion S3' and the second (remaining) half semi-circular portion of the rod antenna 1 is received in the enlarged diameter arcuate sleeve portion S3. By doing so, the rod antenna 1 is fully received in the cellular telephone. At the same time, the contact projection 8 formed on each of the arcuate split elements 7 of the split sleeve 6 is abutted with the outer peripheral surface of the rod antenna 1 in an annular form. That is, by the antenna inclining means composed of the split sleeve 6 mounted in the upper sleeve hole 3 and the lower sleeve hole 4 having the offsetting function, the rod antenna 1 is correctly and smoothly vertically received in the cellular telephone.

According to a construction of a rod antenna port in a cellular telephone of the present invention, a sufficient inclination angle can be obtained at the time of pulling out the rod antenna and the antenna can desirably be held in the inclination position after the antenna is pulled out. This serves to restrain the electromagnetic disturbance to a human body during the used of a cellular telephone.

According to a construction of a rod antenna port in a cellular telephone capable of achieving the above object, the split sleeve can be formed from an casting or the like which is inexpensive compared with an expensive cutting article of a spring material. A proper resiliency can be given to such obtained split sleeve by a split spring sleeve which is separately formed from a specific spring material. Thus, a cost-down can be achieved and a manufacturing can be made easily.

Moreover, owing to a provision of the split sleeve and the split spring sleeve, the resilient force can easily be set and the adjustment of a resilient force can be made easily so that the rod antenna can be pulled out with a reduced load and the rod antenna can be pulled out with an inclination and properly held in the inclination position by the resilient force.

The present invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A structure of a rod antenna guide port in a cellular telephone, comprising a rod antenna guide port for allowing a rod antenna in a cellular telephone to be pulled out therethrough with an inclination, said guide port including an upper and a lower sleeve hole for allowing the rod antenna to be inserted therein, said lower sleeve hole serving as means for pressing, when the rod antenna is pulled out, one side surface of a lower end portion of the rod antenna so that the rod antenna is offset to one side, thereby enabling the antenna to be pulled out with an inclination through said upper sleeve hole, wherein said upper sleeve hole includes a slit sleeve composed of a plurality of split elements annularly arranged, a split spring sleeve being externally fitted to said split sleeve so that said slit sleeve can be expanded and contracted in a radial direction, said split elements of said slit sleeve being pressed by the rod antenna pulled out with an inclination so that said split elements are expanded against a resilient force of said split spring sleeve, a lower portion of the rod antenna being pressed against an inner wall of each of said split elements by a restoring force of said expanded split elements, so that the rod antenna is assuredly pulled out with an inclination.

2. A structure of a rod antenna guide port in a cellular telephone according to claim 1, wherein each of said split elements composing said split spring sleeve is provided on an intermediate portion of an inner peripheral surface thereof with a contact projection projecting inwardly, and said contact projection is provided on an upper portion thereof with an upper guide hole comprised of an inclined surface expanded in a pulling out direction of the rod antenna and on a lower portion thereof with a lower guide hole comprised of an inclined surface expanded in a receiving direction of the rod antenna, such that when the rod antenna is pulled out with an inclination, said lower portion of said antenna is brought into abutment with the inclined surfaces of said upper and lower guide holes.

3. A structure of a rod antenna guide port in a cellular telephone according to claim 2, wherein said split elements are separated from each other.

4. A structure of a rod antenna guide port in a cellular telephone according to claim 1, wherein said split elements are separated from each other.

5. A structure of a rod antenna guide port in a cellular telephone according to claim 1, wherein said lower sleeve hole is comprised of an enlarged diameter arcuate sleeve portion and a reduced diameter arcuate sleeve portion connected together, and when the rod antenna is pulled out, a connecting angular portion between said enlarged diameter arcuate sleeve hole portion and said reduced diameter arcuate sleeve hole portion press one side surface of a lower portion of the rod antenna so that the rod antenna lower portion is allowed to escape into said enlarged diameter arcuate sleeve hole portion and offset to one side, and when the rod antenna is received in the cellular telephone, an upper end portion of the rod antenna is received into said reduced diameter arcuate sleeve hole portion.

* * * * *